United States Patent [19]
Becavin et al.

[11] 3,787,861
[45] Jan. 22, 1974

[54] IMPROVEMENTS IN DOPPLER INSTRUMENT LANDING SYSTEMS

[75] Inventors: Henri Becavin; Bruno Letoquart, both of Paris, France

[73] Assignee: Thomson-CSF, Paris, France

[22] Filed: Dec. 7, 1971

[21] Appl. No.: 205,527

[30] Foreign Application Priority Data
Dec. 11, 1970  France .............................. 70.44760

[52] U.S. Cl. ......................... 343/106 D, 343/108 M
[51] Int. Cl. ................................................ G01s 1/38
[58] Field of Search ........ 343/106 D, 108 R, 108 M, 343/109, 113 DE

[56] References Cited
UNITED STATES PATENTS

| | | | |
|---|---|---|---|
| 3,354,461 | 11/1967 | Kelleher .......................... | 343/100 SA |
| 3,115,634 | 6/1959 | Karpeles .......................... | 343/108 R |
| 3,130,407 | 9/1961 | Kramar ............................ | 343/106 D |
| 2,593,485 | 4/1952 | Pickles et al. ....................... | 343/109 |
| 3,283,326 | 11/1966 | Watts, Jr. ......................... | 343/108 R |
| 3,309,708 | 3/1967 | Toman et al. .................... | 343/108 M |
| 3,290,687 | 12/1966 | Hofgen ............................ | 343/108 M |
| 3,670,337 | 6/1972 | Earp et al. ................... | 343/106 D X |

FOREIGN PATENTS OR APPLICATIONS
1,003,317  9/1965  Great Britain ................. 343/106 D
1,961,715  7/1970  Germany ....................... 343/106 D Primary Examiner—Benjamin A. Borchelt
Assistant Examiner—Richard E. Berger
Attorney, Agent, or Firm—Edwin E. Greigg

[57] ABSTRACT

A transmitter for a Doppler ILS system comprises two antenna systems operating in a diplex arrangement; the first antenna system is conventional, and is formed by an array of antennas regularly spaced and by an auxiliary antenna, it allows an angle measurement in a comparatively inaccurate fashion; the second antenna system is formed by an array of antennas regularly spaced with a spacing greater than in the first antenna system (the spacing being in either case being measured using as a unit the wavelength corresponding to the operating frequency of the considered antenna array), and by an auxiliary antenna; it would allow an accurate angle measurement were it not for an indetermination; in the Doppler ILS receiver co-operating with this transmitter the choice of the line carrying the information in the spectrum of the low frequency signal derived from the signals received from the second antenna system and permitting an accurate measurement is made by means of the information derived from the signal received from the first antenna system.

7 Claims, 5 Drawing Figures

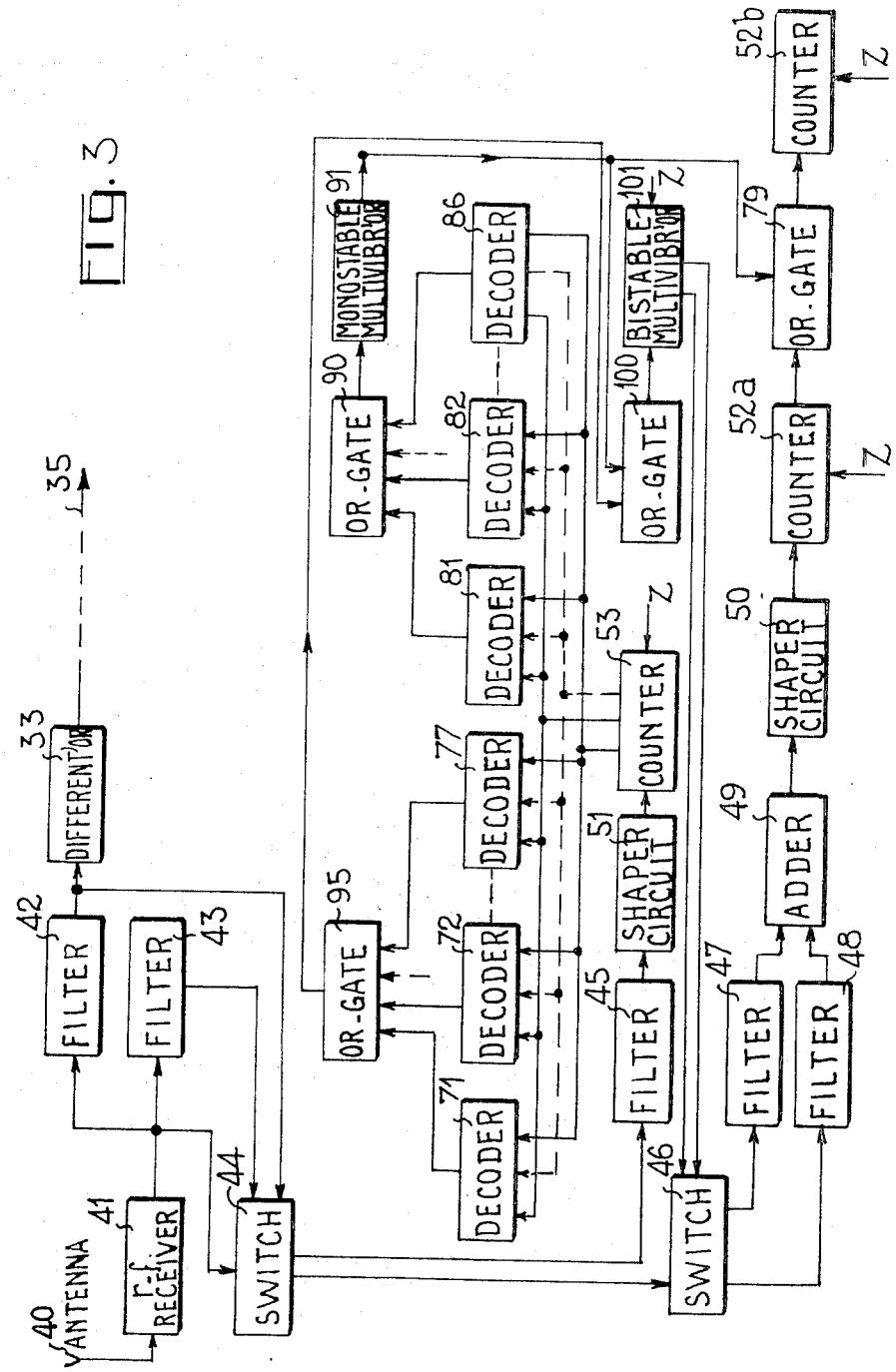

IMPROVEMENTS IN DOPPLER INSTRUMENT LANDING SYSTEMS

The ILS Doppler landing system has the advantage over the conventional ILS system that it does not impose a fixed landing trajectory : the aircraft is free to choose its elevation and bearing angles.

The object of the present invention is a device for improving the accuracy of the system, this without increasing the measurement time nor the spectrum occupied. The device proposed makes it possible to achieve very high precision while retaining reasonable antenna ground coverage.

In accordance with the invention there is provided a Doppler ILS transmitter comprising : first and second antenna systems "located for transmitting signals for the measurement of one and the same angle", each of said antenna systems comprising a rectilinear array of antennas and an auxiliary antenna, the arrays of said two systems having the same direction, the spacing between the antennas of said array of said first system being less than $\theta\ 1/2 \sin \theta_o$, where $\theta_1$ is a fixed wavelength, and $\theta_o$ a fixed angle corresponding to the maximum absolute value of said angle to be measured, the spacing between the antennas of said array of said second system being greater than $\lambda 2/2 \sin \theta_o$, where $\theta_2$ is a fixed wavelength; means for simultaneously feeding said array of said first system, at a frequency $f_1$ corresponding to said wavelength $\theta_1$, so as to cause each of the antennas of said array of said first system to successively radiate for a fixed time duration $T_1$, and said auxiliary antenna of said first system at a fixed frequency $f_3$; means for simultaneously feeding the array of said second system at a fixed frequency $f_2$, corresponding to said wavelength $\lambda_2$ so as to cause each of the antennas of the array of said secondary system to successively radiate for a fixed time duration $T_2$, and said auxiliary antenna of said second system at a fixed frequency $f_4$.

In accordance with the invention, there is further provided a Doppler ILS receiver for a co-operating with the transmitter described hereinabove, said receiver comprising first means, having first and second outputs, for receiving the signal emanating from said first and second antenna systems, deriving from the signal emanating from said array of said first antenna system and, simultaneously, from the auxiliary antenna of said first antenna system, a signal referred to as the first measurement signal the frequency of which approximately determines the value of said angle to be measured, deriving from the signals emanating from said array of said second antenna system and, simultaneously, from said auxiliary antenna of said second antenna system, a signal, referred to as the second measurement signal, the frequency of which when corrected by $K_o/T_2$, where $K_o$ is an algebraical integer, determines the value of said angle to be measured with a better approximation than the frequency of said first measurement signal, and directing said first and second measurement signals respectively to said first and second outputs; and a measurement circuit, coupled to said first and second outputs, for deriving the value of $K_o$ from the frequency of said first measurement signal and delivering a numerical value which is a predetermined linear function of the frequency of said second measurement signal as corrected by $K_o/T_2$.

The invention will be better understood and other of its features rendered apparent, from a consideration of the ensuing description and the related drawings in which :

FIG. 3 is a diagram of an embodiment of a receiver in accordance with the invention;

The Doppler ILS system is a landing aid which carries out a measurement of the position of the aircraft in terms its elevation and bearing. The measurement of range is effected by an entirely separate piece of equipment which does not form part of the subject of the invention and will not be referred to in the following.

Figure 1:
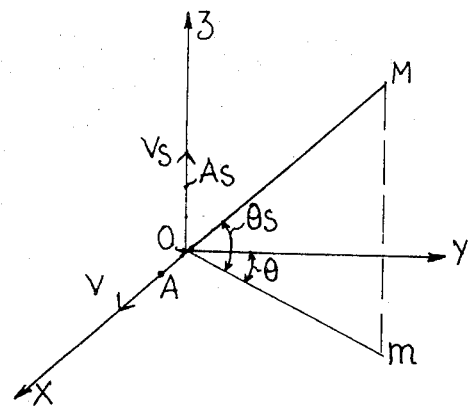
FIG. 1 is a geometric figure illustrating the principle of Doppler ILS systems.

The elevation and bearing angles are measured in accordance with the following principle (FIG. 1).

In the drawing, there is shown a rectangular system of coordinates Oxyz, where Oz is the vertical from the origin O, and Oy the horizontal straight line in relation to which bearing is measured.

Let M be a fixed point in space, $m$ its projection onto the plane $xOy$, its elevation and bearing being $\theta_s$ and $\theta$.

Let A be a moving source emitting radiation of frequency $f$ and travelling at the velocity $v$ along the axis $Ox$.

A sell-known calculation shows that the frequency received at M is $f + \Delta f$, where $\Delta f/f = v \sin \theta/c$, $\theta$ being the bearing of the point M, and $c$ the velocity of the propagation of the waves.

Similarly, if a mobile source $A_s$ producing frequency $f_s$ displaces along the axis $O_z$ at a velocity $v_s$, the frequency received at M will be $f_s + \Delta f_s$ where $\Delta fs/fs = v_s \sin \theta_s/c$, in which $\theta_s$ is the elevation of point M.

In those expressions, the angle $\theta$ and the angle $\theta_s$ should be considered as being positive or negative depending upon whether the normal projection of the source an the straight line OM, is moving towards or away from the point M.

In fact, in order that sufficiently high source velocities be obtained, the mobile source is simulated by an array of antennas arranged along the axis of the fictive motion, each radiating in succession. The approximation is the better the more antennas there are and the closer they are spaced.

The scanning of the array can be operated in "sawtooth" fashion, that is to say that after the antennas, of the array followed in a given direction have radiated, the same process starts over again; it is equally possible to carry out "go and return" operations, in other words alternately sweeping the array in one direction and then in the other.

The aforegoing suffices to show that the case of a single one of the two angular measurements needs to be considered, for example, that of the bearing measurement, since the explanation which will be given can readily be transferred to the case of elevation.

The velocity $v$ is necessarily very small compared with $c$ with the result that the frequency differences $\Delta f$ measured, will be very small. On the other hand, the point M under consideration is in reality moving. In order to obviate both the first difficulty, which is a technological one, and the second which is a fundamental one, it is wellknown to employ an auxiliary antenna in the neighbourhood of the antenna array, to emit radiation of frequency $f_o = f \pm f_r$ where $f_r$ is sufficiently small compared with $f$ for the movement of the aircraft to affect in an identical manner the radiation received from the "moving source" and that received from the fixed auxiliary antenna, and sufficiently large for the frequency $f_r \pm \Delta f$ to be positive at all times and sufficiently high to enable accurate measurement to be made.

The aircraft thus receives the two frequencies $f + \Delta f + \Delta f_a$ and $f \pm f_r + \Delta f_a$ where $\Delta f_a$ is a term representing the Doppler effect produced by the movement of the aircraft.

As a consequence of beating these two frequencies, the aforementioned frequency $f_r \pm \Delta f$ is obtained, where $f_r$ is known.

In fact, the Doppler ILS system does not wholly provide the requisite precision.

It has been seen that:

$$\Delta f = fv \sin \theta / c$$

In addition, other things being equal (transmitted power, enabling the error due to noise components to be reduced, length of the antenna array, enabling the measurement error to be reduced), the accuracy evidently increases with the product $fv$. However, $v$ is equal to $d/T$, where $d$ is the interval between two antennas of the array and $T$ is the time for which each of them radiates.

A minimum value is imposed upon $T$ by the bandwidth which international standards permit in the radiated signal, the bandwidth increasing of course in proportion with $1/T$.

It is thus the product $fd$ which it should be sought to increase.

At this point, an approximation must be considered, i.e., that which consists in simulating the continuous motion of a source by means of the switching of N radiating elements.

In fact, whereas in the case of a true moving source, the signal resulting from the beating between the signals received from the moving source and the auxiliary antenna can be likened to a single spectrum line $f_r + \Delta f$ (assuming $f > f_o$), this same beat signal, in the case where the moving source is simulated by switching N antennas, has a more complex expression. It can be shown that for the relatively large number of radiator elements required in practice, the spectrum of this beat signal can be likened to a set of spectrum lines $\Sigma_j(f_r + E_j)$ spaced at intervals of $1/T$. The line closest to $f_r$ in this signal, which will be referred to as the principal line, has the maximum amplitude but only constitutes the line carrying the information, $f_r + (fv \sin \theta/c) = f_r + (d \sin \theta / \lambda \, T)$ where $\lambda$ is the wavelength corresponding to the frequency $f$, if $$| \, d \sin \theta / \lambda \, T \, | < 1/2T$$

which gives:

$$| \, d \sin \theta / \lambda \, | < \tfrac{1}{2}$$

In order to avoid any uncertainty, the systems utilized employ a value of $d$ which respects this measurement interval condition, so that if $\theta_o$ is the maximum absolute value of the angle to be measured: $d < (\lambda)/(2 \sin \theta_o)$. Considering for example an interval from $-90°$ to $+90°$, as required by a bearing measurement, the condition:

$$fd < f(\lambda/2) = c/2$$

must be fulfilled, which condition involves an absolute limit on the product $fd$. In other words, if $f$ is increased then $\lambda$ is reduced and so is the upper limit of $d$; on the other hand if $\lambda$ is increased, then $f$ is reduced.

The principle of the transmission-reception system in accordance with the invention is as follows: The transmitter employs two sets of aerials each formed by an antenna array and an auxiliary antenna. The first is conventional, that is to say the interval d between the antennas of the array is less than $(\lambda_1)/(2 \sin \theta_o)$, where $\lambda_1$ is the wavelength corresponding to the transmitted frequency $f_1$ and $\theta_o$ the maximum absolute value of the angle being measured; in accordance with the prior art, it makes it possible on reception to determine the measured angle with a comparatively poor accuracy but without any indetermination. In the other system, the interval D between the antennas of the array will be in excess of $(\lambda_2)/(2 \sin \theta_o)$ where $\lambda_2$ is the wavelength corresponding to the transmitter frequency $f_2$. It makes it possible, by measurement of the frequency of a spectrum line of the signal resulting from beating between the two signals received from the second antenna system, to effect an accurate angular measurement, but with an indetermination of $K/T_2$, where $K$ is an integer and $T_2$ is the time of transmission of each antenna of the array, the value of $K$ being determined by means of digital circuits, as will be explained in the course of the description of the receiver.

The invention will be described by way of nonlimitative example in application to the following concrete case:

The angle in question is the bearing angle, and varies from $-90°$ to $+90°$.

The two antenna systems operate in diplex fashion, using time-division multiplex techniques; consequently, the two arrays can transmit at the same frequency, $f$, to which there corresponds a wavelength $\lambda$ and the auxiliary antenna can be common to the two systems, said auxiliary antenna radiating the frequency $f - f_r = f_o$.

For example, the frequencies are $f_o = 5$ Mc/s, $f_r = 100$ Kc/s.

The two arrays are each composed of 32 separate dipoles. In the first, the interval between antennas is $d = \lambda/3$ and in the second it is $D = 3\lambda = 9d$.

The two arrays are swept "sawtooth" fashion, the time of transmission of each antenna during a sweeping cycle, being $T$, the latter being for example 20 $\mu$s, so that the fictive velocity of the source is $v = d/T$ in the case of the first array and $9 d/T = 9 v$ in the case of the second. The direction of sweeping and the sign conventions are such that the bearing angle and the Coppler frequency shift have the same sign.

Figure 2:
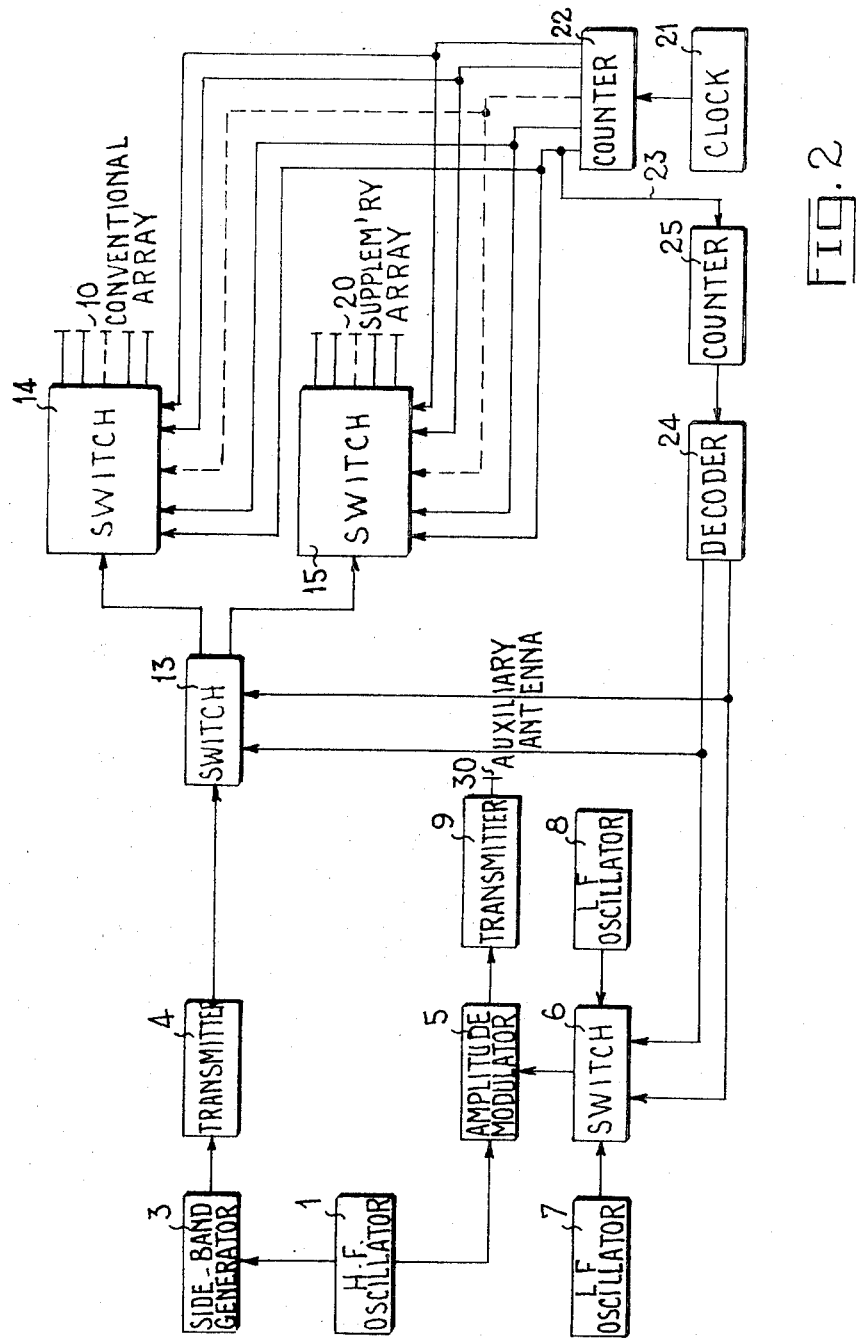
FIG. 2 is a diagram of an embodiment of a transmitter in accordance with the invention.

The transmitter (FIG. 2) embodies an HF oscillator, 1, of frequency $f_o$, and a device 3 which produces with high accuracy from the frequency $f_o$, radiation of frequency $f_o + f_r$, where $r_r$ is very small compared with $f_o$. The device 3 may for example be a side-band generator.

The oscillator 1 supplies the carrier input of an amplitude modulator 5 whose modulation input can be connected through a switch 6 to two control inputs, either to a low-frequency oscillator 7 of frequency F, or to a low-frequency oscillator 8 of frequency F′, the frequencies F and F′ being located outside the band of frequencies occupied by the signals $U_1$ and $U_2$ hereinafter defined.

The output of the modulator 5 supplies a transmitter 9 feeding the dipole 30 which is the auxiliary antenna of the two systems, with an amplitude modulated wave of frequency $f_o$.

The device 3 supplies a transmitter 4 at the frequency $f = f_o + f_r$, which transmitter, through a switch 13 with an HF input, two outputs ant two control inputs, supplies either a switch 14 or a switch 15. Each of these two latter switches has 32 outputs and 32 control inputs; the outputs of the switch 14 are respectively connected to the 32 dipoles of the conventional array 10 and those of the switch 15 to the 32 dipoles of the supplementary array 20.

The assembly is controlled by a synchronizing device embodying a clock 21 of frequency 1/T and a modulo-ring counter 22, supplied by the clock 21.

The 32 outputs of the counter 22, respectively supplied for its 32 possible states 1, 2, . . . 31, 32, are respectively connected to the 32 control inputs of each of the switches 14 and 15.

The output of the counter 22 which is supplied for the one condition of the counter, is likewise connected to the input of a modulo $m + n$ binary counter, 25, whose outputs are connected to the inputs of a decoder 24 with two outputs, the first of which supplies a level 1 signal for states 1 to $m$ of the counter 25, the level 0 in all other cases, and the second of which produces a level 1, signal for the ($m+1$) to $m+n$ states, and the level 0 in all other cases.

These two outputs are respectively connected to the two control inputs of each of the switches 6 and 13 in order that for the states 1 to $m$ of the counter 25, the switch 13 supplies the switch 14, and the oscillator 7 the modulator 5, while for the states $m+1$ to $m+n$, the modulator 13 supplies the switch 15 and the oscillator 8 the modulator 5.

The switches 6, 13, 14 and 15 may be diode switches.

The operation of the device is immediately apparent from the connections described.

The transmitter operates with a periodicity of $(m+n)T'$, where $T' = 32 T$.

During the first m time intervals T', the dipole array 10 is swept $m$ times and emits a radiation of frequency $f$, while the auxiliary antenna 30 emits radiation which is modulated by the signal of frequency F.

During the last $n$ time intervals T', the dipole array 20 is swept $n$ times while the auxiliary antenna 30 emits radiation modulated by the signal of frequency F'.

In view of the fact that it is the second antenna system which provides the accuracy, advantageously $n$ will be made larger than $m$ for example $m = 5$, $n = 50$.

FIG. 3 is the diagram of a corresponding receiver.

It comprises an antenna 40 supplying a radio frequency receiver 41, the low frequency stage of which delivers a complex low-frequency signal which comprises, during transmission by the first array of the transmitter: — a signal $U_1$ produced by beating between the signals $S_1$ and $S_3$ respectively received from the d-spaced array and the auxiliary antenna; — and a signal of frequency F produced by demodulation of the signal received by the auxiliary antenna.

During transmission from the second array, these two signals are respectively replaced by a signal $U_2$, resulting from beating between the signals $S_2$ and $S_4$ respectively received from the D-spaced array and the auxiliary antenna, and a signal of frequency F' obtained by demodulation of the signal received by the auxiliary antenna.

The way in which these signals are to be utilized, will be explained by means of the curves of FIGS. 4 and 5.

The signal $U_1$ comprises a spectrum line which is closest to the frequency $f_r$ and whose frequency is $f_r + \Delta f_1$, where :

$$\Delta f_1 = fv \sin \theta/c = d \sin \theta/\lambda T = \sin \theta/3T$$

represents the desired information. This spectrum line, which constitutes the "first measurement signal" is necessarily comprised in the interval : $f_r - (1/3\ T)$ to $f_r + (1/3\ T)$, and is necessarily unique within this interval.

Figure 4:
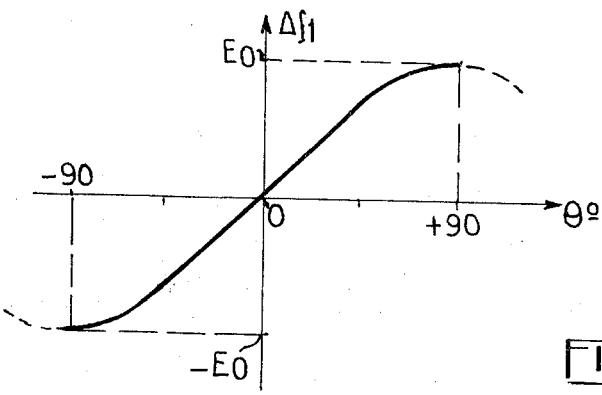
FIG. 4 and 5 are curves illustrating the operation of the receiver shown in FIG. 4.

FIG. 4 shows the graph plotting the variation of $\Delta f_1$ as a function of $\theta$ through the interval $-90°$ to $+90°$, the value $E_o$ of $f_1$ corresponding to $\theta = 90°$, or in other words $d/\lambda T = 1/3\ T$.

The second measurement signal utilized during the operation of the second antenna system, will be the principal spectrum line, hereinbefore defined, of the signal $U_2$ obtained by beating between the signals $S_2$ and $S_4$, and its frequency will be $f_r + \Delta f_2$.

Figure 5:
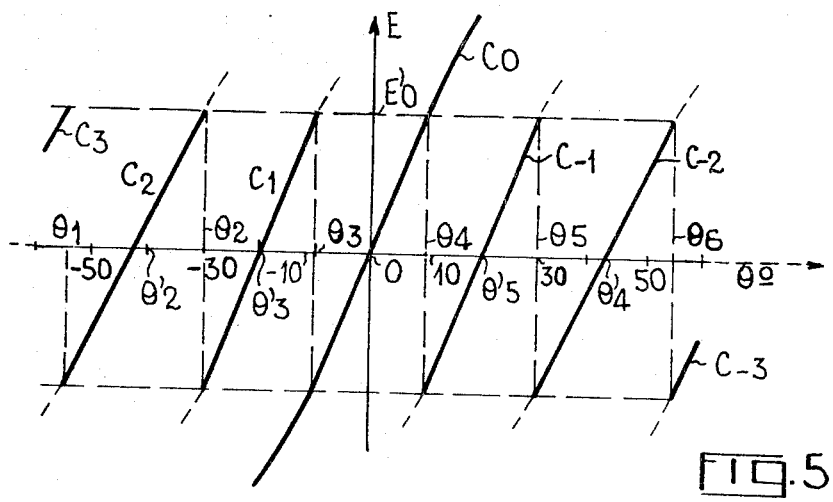

E designating the frequency intervals separating the different spectrum lines of the signal $U_2$ from the frequency $f_r$, FIG. 5 shows the central part of the set of characteristics giving E as a function of $\theta$ for the various spectrum lines. The curve $C_o$ corresponds to the information-carrying line $R_o$, that is to say the one for which :

$$E = 9\ fv \sin \theta/c = D \sin \theta/\lambda T = 3 \sin \theta/T$$

and the curves $C_1$, $C_2$, $C_{-1}$, $C_{-2}$ etc. correspond to the lines $R_1$, $R_2$, $R_{-1}$, $R_{-2}$ which are derived from $C_o$ by translations of $1/T$, $2/T$, $-1/T$, $-2/T$ etc. parallel to the axis of the frequency intervals. Measuring the frequency of the line $R_j$, instead of that of the line $R_o$, thus means an error of $j/T$ in the Doppler frequency shift.

The line $R_o$ identifies with the principal line of the spectrum only if :

| 3 sin $\theta$/T | < 1/2 T , i.e., for sin $\theta$<1/6 and $\theta$ ranging between ± 9½° approximately, the corresponding limiting points on the graph $C_o$ having respective ordinate values and $E'_o = (1/2\ T)$ and $-E'_o$ Between 9.5° and 30°, it is the line $R_{-1}$ which becomes the principal line and then, for angles rising by positive amounts, successively the lines $R_{-2}$, $R_{-3}$; for negative angles, beyond $-9.5°$ the lines will successively be $R_1$, $R_2$, $R_3$.

The values of $\theta$ delimiting these intervals are those for which there are two successive lines in respect of which the intervals E are minimum and equal in absolute value.

Calling r the index of a curve such as $C_o$, $C_1$, $C_{-1}$, etc , the limiting values will be given by the solutions of the equation (D sin $\theta/\lambda T$) + $(r/T)$ = $-$[D sin $\theta + (r-1/T)$], where $r$ is an algebraical integer. This may be written 2 D sin $\theta/\lambda\ T = (-2\ r + 1)/T$ D sin $\theta/\lambda\ T = (-2\ r + 1)/T$ or putting $k = -r$ D sin $\theta/\lambda\ T = 2k + 1/2T$, where $k$ is an algebraical integer as $r$ was.

For D = 3 $\lambda$, this equation becomes 6 sin $\theta$ = 2 $k$ + 1, for the possible values of $k$ i.e., for those values of $k$ for which the absolute value of $2k + 1$ does not exceed 6, namely $-3, -2, -1, 0, +1, +2$, six values of $\theta$ marked $\theta_1, \theta_2, \ldots \theta_6$ in rising order are obtained, these six values corresponding to only three different absolute values: $\theta_1 = -\theta_6, \theta_2 = -\theta_5, \theta_3 = -\theta_4$.

The eight values $-90, \theta_1, \theta_2, \ldots \theta_5, \theta_6$ and $+90°$ delimit seven bands of values of $\theta$, designated hereinafter as bands 1, 2 . . . 7 in algebraically increasing values of $\theta$.

On the other hand, in each of these bands there is a point of intersection between a curve C and the $\theta$ axis. The 7 intersection points corresponding to the bands 1, 2, . . . 7, correspond to values $\theta'_1 \ldots \theta'_7$ of $\theta$, these latter being solutions to the equation :

$2 D \sin \theta / \lambda T = 2 K'/T$ , where K' is a whole number, this, for $D = 3 \lambda$, gives the equation $3 \sin \theta = K'$, the solutions of which correspond to the 7 values $-3$ to $+3$ of K'

The output of the receiver 41 is connected to two devices 43 and 42, the first of which incorporates a band-pass filter tuned to the frequency F and followed by a threshold device, and the second of which is a band-pass filter tuned to the frequency F' followed by a threshold device, so that the first supplies a signal of level 1 when the first array of the transmitter radiates, and a signal of level 0 in all other cases, while the second supplies a signal of level 1 when the second array of the transmitter radiates, and a signal of level 0 in all the other cases.

The output of the receiver 41 also supplies a switch 44 comprising two control inputs respectively connected to the outputs of the devices 42 and 43, and two outputs respectively connected to a filter 45 and to the input of a switch 46 which comprises two outputs respectively connected to two filters 47 and 48 and control inputs.

The switch 44 is controlled by the output signals of the devices 42 and 43 in order to supply the filter 45 in the presence of the signal of frequency F, and the switch 46 in the presence of the signal of frequency F'.

The filter 45 is a band-pass filter centred on $f_r$ with a pass-band of $f_r - E_o$ to $f_r + E_o$.

The condition $d/\lambda < \frac{1}{2}$ implying $E_o < +1/2\ T$ , in the presence of the signal $U_1$ the filter 45 will simply produce the single spectrum line of frequency $f_r + \Delta f_1$.

The filters 47 and 48 are designed so that one or the other of them passes that line of the spectrum of the signal $U_2$ which is closest to $f_r$, the filter 47 being designed to transmit this line if it has a frequency higher than $f_r$, and the filter 48 to transmit it if the frequency is less than $f_r$. Their respective bandwidths range from $f_r - \epsilon$ to $f_r + (1/2\ T) + \epsilon$ and from $f_r - (1/2\ T) - \epsilon$ to $f_r + \epsilon$ , the term $\epsilon$ having a small value designed to take account of the error produced by the inaccurate measurement, as will be explained hereinafter.

The outputs of the filters 47 and 48 are connected through an adder 49 to a shaper circuit 50 producing one pulse per cycle of its input signal. The filter 45 directly supplies a shaper circuit 51 of identical design.

The circuits 50 and 51 respectively supply two binary counters.

The capacity of the counter 53, supplied by the circuit 51, is at least $m(f_r + E_o)\ 32\ T, f_r$ and $E_o$ being expressed in cycles per second and T in seconds.

The counter supplied by the circuit 50 has a total capacity which is at least $n[f_r + E_o + \epsilon + (6/T)]\ 32T$. It comprises a first stage 52a, of capacity $32n$ connected through an OR-gate 79 with two inputs, to a second stage 52b.

The counter 53, the stages 52a and 52b are provided with zeroing inputs Z.

The $p$ outputs of the counter 53 are respectively connected to the $p$ inputs of each of the six decoders 81 to 86 only three of which have actually been shown. These six decoders are simple detectors respectively of six numbers $N_1, N_2, \ldots N_6$ which will be explained in more detail hereinafter. Each of these decoders comprises a single output producing a signal of level "1" if the number registered by the counter 53 is equal to the number $N_i$ corresponding to this decoder, and a signal of level 0 if the contrary is the case.

The outputs of the six decoders 81 to 86 supply an OR-gate 90, with six inputs and an output connected to one input of a monostable multivibrator 91 equipped with an input differentiator.

On the other hand, the $p$ outputs of the counter 53 are respectively connected to the $p$ inputs of each one of seven supplementary decoders 71 to 77, only three of which have actually been shown, these being similar to the ones aforementioned and detecting seven numbers $M_1$ to $M_7$ which will be defined hereinafter.

The outputs of the seven decoders 71 to 77 are connected to the seven inputs of an OR-gate 95.

The outputs of the monostable trigger stage 91 and the OR-gate 95 are respectively connected to the two inputs of an OR-gate 100 whose output controls a bistable trigger circuit 101 whose two own outputs are connected to the control inputs of the switch 46. The output of the monostable trigger stage 91 is also connected to the second input of the OR-gate 79.

The multivibrator 101 has a zeroing input Z.

Finally, the device 42 supplies a differentiating circuit 33 producing a pulse when the output signal from the device 42 changes from the 1 to the 0 condition, but not in the reverse case.

The output 35 of the differentiator 33 controls the zeroing of the elements 53, 52a, 52b and 101. The connections between the output 35 and the input Z of these elements have not been shown simply in order not to overburden the drawing.

The receiver operates as follows :

At the end of a measurement cycle, the frequency F' ceases to appear in the output signal of the receiver. The output signal of the device 42 changes from the 1 to the 0 condition and the aforementioned elements are reset to zero.

At the beginning of the next meaurement cycle, the devices 42 and 43 control the switch 44 so that the output signal from the receiver is directed to the filter 45 which produces the first measurement signal. The latter is converted into pulses, one per cycle, by the circuit 51 and the counter 53 counts these pulses.

The six numbers $N_1$ to $N_6$ respectively correspond to the six angles $\theta_1$ to $\theta_6$ hereinbefore defined, taking into account the duration, $(m)$ (32T), of the counting operation.

In other words : $N_i = [f_r + \Delta f_1\ (\theta_i)]\ (m)\ (32T), \Delta f_1\ (\theta_i)$ is the frequency interval in cycles per second corresponding to $\theta_i$ (FIG.4).

The numbers $M_1$ to $M_7$ correspond in the same way to the seven values of $\theta$, namely $\theta'_1, \theta'_2, \ldots \theta'_7$, hereinbefore defined.

Each time the counter N passes through one of the values $N_1$ to $N_6$, a pulse is applied to the OR-gate 79.

It will be seen, therefore, that if the angle $\theta_m$ measured by the first measurement signal, is comprised within the $j^{th}$ of the seven intervals whose values have been defined hereinbefore, the counter stage 52b will, at the end of this first measurement, have received $(j-1)$ pulses, equivalent to $(j-1)32n$ pulses at th input of the stage 52a.

The multivibrator 101, initially in the zero condition, will change stage each time it receives a control pulse corresponding to a value $\theta_1$ to $\theta_6$ or $\theta'_1$ to $\theta'_7$, its final state depending upon $\theta_m$. Its outputs are connected to the control inputs of the switch 46 so that the latter connects its signal input to the filter 48 if it is in the zero condition, and to the filter 47 if it is in the 1 condition; in the final condition of the multivibrator 101, at the end of counting, the filter 48 or the filter 47 will be supplied, depending upon whether $\theta_m$ is located in the first or the second interval, separated by $\theta'_j$, of the band $j$.

When the second array of the transmitter begins radiating, the switch 44 directs the output signals of the receiver to the switch 46; the filter 47 or the filter 48 will be supplied in the manner described hereinbefore.

It will be observed that if the angle $\theta$ to be measured is close to one of the limiting values $\theta_1$ to $\theta_6$, it may happen that the angle $\theta$ will be classed by the first measurement in a band adjacent to the correct band, and the correction effected will differ in absolute value by $1/T$ c/s in relation to the theoretical correction. However, this correcting error will be compensated by the fact that there is an error of identical value and opposite sign, in the frequency of the principal spectrum line.

In this case indeed it will not be the principal spectrum line which will be selected by one of the filters 47 or 48, but a line whose frequency differs from that of the principal line by $+ 1/T$ or $- 1/T$. The constant $\epsilon$ in the pass band of the filters 47 and 48, takes account of the fact and the utilisation of two filters prevents two lines being selected simultaneously.

In a general way, if $\Delta f_2$ is used not necessarily to designate the frequency interval corresponding to the principal line, but that of a line selected in some fashion or other within the signal $U_2$, then the nominal relationship (assuming the two measurements to be exact) $\Delta f_2 + (K/T) = (D/d) \Delta f_1$, will be obtained, where K is a whole number, the correct value of K being determined unambiguously, by the relation :

$$| \Delta f_2 + (K/T) - (D/d) \Delta f_1 | < 1/2T$$

This is the reason why, in stating here and in the claims that the correct value $K_o$ of K is a function of the frequency of the first measurement signal, this does not exclude it also being a function of the frequency of the second measurement signal although in the embodiment described here, this value is determined by the measurement frequency of the first measurement signal alone.

It will be observed that if $\theta$ is close to a value $\theta'_j$, and if the first measurement situates it incorrectly in relation to $\theta'_j$, the principal line will then be selected taking into account the constant which figures in the expression of the bandwidths of the filters 47 and 48, and that in addition this will not give rise to any error in the correction.

The second measurement signal is converted into pulses by the circuit 50 and these pulses are supplied to the counter stage 52a.

At the end of said second measurement, which has a time of $nT'$, the counter stage 52b will register the number :

$$s = n [f_r + (j-1/T + \Delta f_2]32T$$

The sine of the angle $\theta$ to be mesured, is given by :

$$D \sin \theta/\lambda T = 3 \sin \theta/\lambda T = \Delta f_2(\theta) + j - 4/T$$

It is thus derived from s by a linear equation since $j-4/T$ differs from $j-1/T$ by the constant $3/T$.

Self-evidently, the invention is in no way limited to the embodiment described and illustrated herein, and numerous variant embodiments are open to the person skilled in the art. For example, the times $T_1$ and $T_2$ of the radiation of each antenna, could differ between the two arrays; one would then use $T_1$ and $T_2$, depending upon the case, in the formulae contained in this descripton. The two arrays could have common antennas.

On the other hand, the transmitter could be readily modified for "go and return" sweeping instead of "saw-tooth" sweeping in the arrays. As those skilled in the art will appreciate, this in no way affects the receiver circuits, provided that as far as the arrays are concerned two frequencies $f_o + f_r$ or $f_o - f_r$ are used, depending upon the direction of sweeping.

Similarly, other coding systems are conceivable, in order to indicate the antenna system during operation; frequency modulation of the signal emitter by the auxilliary antenna, pulse-code modulation, etc..

The frequencies of the measurement signals can be determined by other conventional methods such as fast pulse counting where the number of pulses produced by an auxiliary clock is counted over predetermined number of periods of the measurement signal, this requiring corresponding modifications for the determination of the correction $K_o/T_2$.

Finally, at the expense of modifications which are within the scope of the person skilled in the art but which lead to more complex receiver circutis, the diplexing of the two antenna systems could be effected by frequency diplexing, the two arrays radiating at two frequencies $f_1$ and $f_2$ and the two systems each comprising an auxiliary source of frequency $f_3$ close to $f_1$ in the case of the first and of frequency $f_4$ close to $f_2$, in the case of the second.

Of course, the invention is not limited to the embodiments described and shown which were given solely by way of example.

What is claimed, is :

1. A Doppler ILS transmitter comprising : first and second antenna systems located for transmitting signals for the measurement of one and the same angle, each of said antenna systems comprising a rectilinear array of regularly spaced antennas and an auxiliary antenna, the arrays of said two systems having the same direction, the spacing between the antennas of said array of said first system being less than $\lambda_1/2 \sin \theta_o$, where $\lambda_1$, is a fixed wavelength, and $\theta_o$ a fixed angle corresponding to the maximum absolute value of said angle to be measured, the spacing D between the antennas of said array of said second system being greater than $\lambda_2/2 \sin \theta_o$, where $\lambda_2$ is a fixed wavelength ; means for simultaneously feeding said array of said first system, at a frequency $f_1$ corresponding to said wavelength $\lambda_1$, so as to cause each of the antennas of said array of said first system to successively radiate for a fixed time duration $T_1$, and said auxiliary antenna of said first system at a fixed frequency $f_3$; means for simultaneously feeding the array of said second system at a fixed frequency $f_2$ corresponding to said wavelength $\lambda_2$, so as to cause each of the antennas of the array of said second system to successively radiate for a fixed time duration $T_2$, and said auxiliary antenna of said second system at a fixed frequency $f_4$.

2. A Doppler ILS receiver for co-operating with the transmitter claimed in claim 1, said receiver comprising : first means for receiving the signals emanating from said first and second antenna systems, deriving from the signals emanating from said array of said first antenna system and, simultaneously, from the auxiliary antenna of said first antenna system, a signal referred to as the first measurement signal, the frequency of which approximately determines the value of said angle to be measured, deriving from the signals emanating from said array of said second antenna system and, simultaneously, from said auxiliary antenna of said second antenna system, a signal, referred to as the second measurement signal, the frequency of which, when corrected by $K_o/T2$, where $K_o$ is an algebraical integer, determined the value of said angle to be measured with a better approximation than the frequency of said first measurement singal; second means, having an input coupled to said first means, and first and second outputs, for directing said first and second measurement signals respectively to said first and second outputs; and further means, coupled to said first and second outputs, for deriving the value of Khd o from the frequency of said first measurement signal, and delivering a numerical value which is a predetermined linear function of the frequency of said second measurement signal as corrected by $K_o/T_2$.

3. A transmitter as claimed in claim, wherein said two antenna systems operate in time-division multiplex, said frequency $f_2$ being equal to said frequency $f_1$, said frequency $f_4$ being equal to said frequency $f_3$, and said auxiliary antenna being common to said two antenna systems, and wherein modulating means are provided for modulating the signal at applied to said common auxiliary antenna in two different ways according to whether said first or said second antenna system is in operation.

4. A transmitter as claimed in claim 3, wherein said modulating means are means for alternately modulating two low frequency signals of frequencies F and F' on said signal applied to siad sommon auxiliary antenna.

5. A Doppler ILS receiver as claimed in claim 2, wherein the signals from said two antenna systems being alternately transmitted, and the auxiliary antenna of said two antenna systems being common to said two antenna systems and two low frequency signals of frequencies F and F' modulating the signal emanating from said common auxiliary antenna according to whether it is transmitted simultaneously with the signal from said array of said first antenna system or simultaneously with the signal from said array of said second antenna system, said first means comprise a radio frequency receiver having a low frequency stage, and a low frequency common output for delivering two said signals at said frequencies F and F', said first measurement signal and said second measurement signal; said second means comprising first and second filters, respectively tuned to said frequencies F and F', having respective inputs coupled to said low frequency common output, and respective outputs; a first switch having an input coupled to said low frequency common output, a control input coupled to the output of one of said ... filters and first and second outputs for delivering its input signal either to its first output or to its second output according to whether said first filter or said second filter is being energized; a third filter coupled to said first output of said first switch, for delivering said first measurement signal; and a filtering circuit having an input coupled to said second output of said first switch, and an output forming said second output of said first means.

6. A Doppler ILS receiver as claimed in claim 5, wherein said further means measurement circuit comprises : a first counting circuit coupled to said first output of said second means for determining the frequency of said first measurement signal; an auxiliary circuit coupled to said first counting circuit, comprising means for delivering signals representative of the localization of the value of said angle to be measured as determined by said frequency of said first measurement signal in one or the other of consecutive ranges of angular values $\theta$, the limiting values of said ranges corresponding at least approximately to the values of the solutions of the equation $$D \sin \theta/\lambda_2 = 2k + 1 \qquad (2)$$

where $k$ is an algebraical integer; and a second counting circuit having a first input coupled to said second output of said second means and a second input coupled to said output of said auxiliary circuit, for delivering said numerical value.

7. A Doppler ILS receiver as claimed in claim 6 wherein said filtering circuit comprises an input switch, having an input connected to the second output of said first switch and at least one control input and two outputs; fourth and fifth filters having respective inputs respectively coupled to said outputs of said input switch and respective outputs coupled to said second output of said first means and wherein said further means comprises a further auxiliary circuit coupled to said first counting circuit and to said first auxiliary circuit for delivering on said control input of said input switch signals representative of the localization of said value determined by means of said first counting circuit within one or the other of two groups of consecutive intervals of angular vaues $\theta$, two successive ones of said intervals belonging to two different groups, and the limiting values of said intervals corresponding at least approximately to the values of the solution of the equation $$2 D \sin \theta/\lambda_2 ) = K'$$

K' being an algebraical integer.

* * * * *